Figure 1:
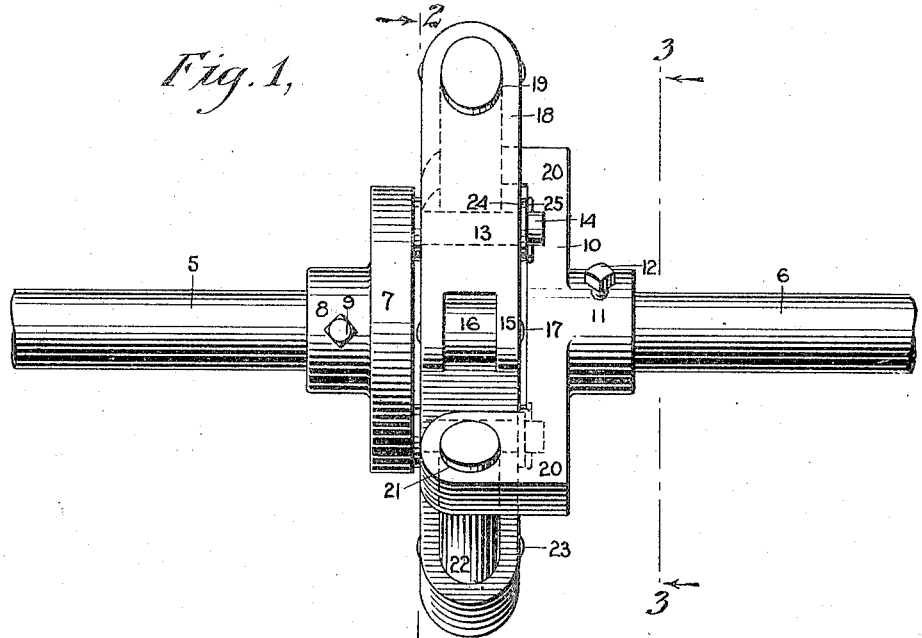

A. N. CLASSON.
FLEXIBLE COUPLING.
APPLICATION FILED JAN. 30, 1915.

1,164,468.

Patented Dec. 14, 1915.

WITNESSES
Edw. Thorpe
E. B. Marshall

INVENTOR
Albert N. Classon
BY Munn & Co
ATTORNEYS

UNITED STATES PATENT OFFICE.

ALBERT N. CLASSON, OF SHERIDAN, ILLINOIS.

FLEXIBLE COUPLING.

1,164,468. Specification of Letters Patent. Patented Dec. 14, 1915.

Application filed January 30, 1915. Serial No. 5,236.

*To all whom it may concern:*

Be it known that I, ALBERT N. CLASSON, a citizen of the United States, and a resident of Sheridan, in the county of La Salle and State of Illinois, have invented a new and Improved Flexible Coupling, of which the following is a full, clear, and exact description.

My invention has for its object to provide a flexible coupling which may be used to connect shafts whether or not they are in alinement.

The coupling is constructed with an arm secured to one of the shafts and which is rotated by members with which it is engaged at its ends, the members being secured to the outer ends of levers fulcrumed to a disk secured to the driving shaft and with the inner ends of the levers connected by a link.

While the flexible coupling may be used for a great variety of purposes, it is especially valuable in connecting driving means on automobiles with magnetos and dynamos and in connection with means for changing an alternating current to a direct current.

Additional objects of the invention will appear in the following specification in which the preferred form of my invention is disclosed.

In the drawings similar reference characters refer to similar parts in all the views in which—

Figure 2:
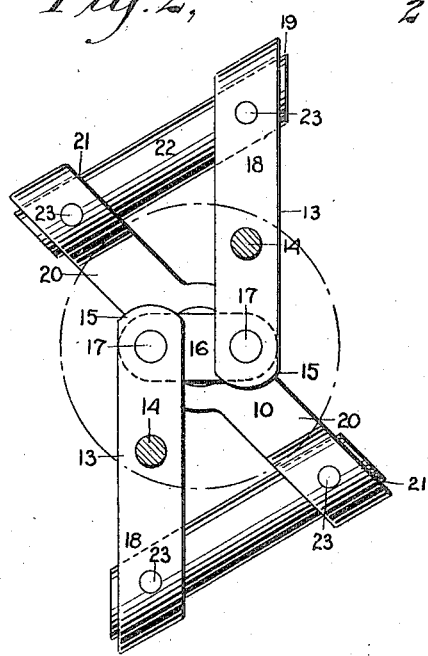
Figure 3:
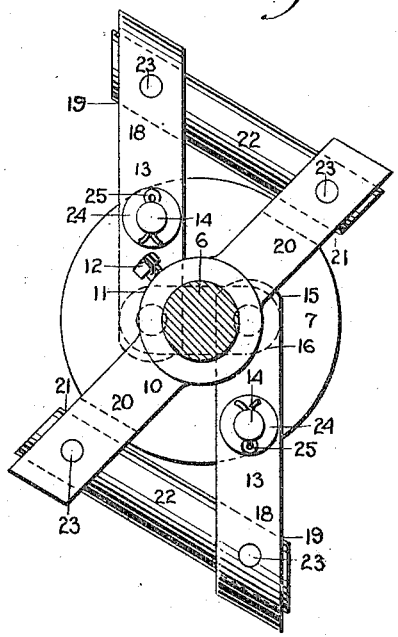

Figure 1 is a view showing my coupling as connecting two shafts; Fig. 2 is a sectional view on the line 2—2 of Fig. 1; and Fig. 3 is a sectional view on the line 3—3 of Fig. 1.

By referring to the drawings it will be seen that there are two shafts 5 and 6, either one of which may be the driving shaft, the other being the driven shaft.

To the shaft 5 there is secured a disk 7 by means of a collar 8 which is disposed around the end of the shaft, a set screw 9 being provided which holds the collar in place. In a similar manner an arm 10 is secured to the shaft 6 by means of the collar 11, and a set screw 12. The disk 7 and the arm 10 are connected in the following manner.

From the face of the disk 7 there project two pins 14, these pins being spaced apart, one from the other. Each of the pins is also preferably spaced from the axis of the shaft 5 on which the disk 7 is mounted. Fulcrumed to the pins 14 there are levers 13, the inner arms 15 of the levers 13 being connected by a fiber link 16 which is pivoted to the arms 15 of the levers at 17. The outer arms 18 of the levers 13 have openings 19, the axes of which are disposed in planes substantially at right angles to the axes of the pins 14. In the ends 20 of the arm 10 there are similar openings 21, one end 20 of the arm 10 being connected with an outer arm 18 of a lever 13 by a leather or other similar flexible connection 22, the other end 20 of the arm 10 being connected to the outer arm 18 of the other lever 13 in a similar manner. As illustrated in the drawings, these leather connecting members are disposed in the openings 19 and 21 and are secured in place by means of the pins 23. The levers 13 are held on the pins 14 by means of washers 24 and cotter pins 25.

It will be understood that when one of the shafts 5 is moved out of alinement with the other shaft 6, the levers 13 will rotate on the pins 14 to permit of the new adjustment of the members of the coupling, the link 16 permitting this movement. When one of the shafts is rotated relatively to the other, as for instance, when the shaft 6 is rotated by means of the shaft 5, the rotary movement of the disk 7 will carry around the pins 14, which will move the fulcrums of the levers 13 in a manner well understood, and as the leather members 22 are secured to the ends of the arm 10, there will be a pull on the outer arms of the levers 13. This would serve to rotate the levers 13 if it were not for the fact that the inner arms 15 of the levers 13 are connected by the link 16. This prevents the rotation of the levers 13 on the pins and holds the levers in position to rotate the arm 10 by means of the leather members 22.

When the shafts lie in parallel planes but not in alinement, the levers position themselves to accommodate the adjustment, the leather connections permitting this movement of the levers. The levers 13 are preferably made of fiber, rawhide, or aluminum with fiber bushings for the pins 14.

Having thus described my invention I claim as new and desire to secure by Letters Patent:

1. In a flexible coupling, an arm adapted to be secured to a shaft, a disk adapted to be secured to another shaft, two levers pivoted to the disk intermediate of their terminals and with their fulcrums spaced apart, a link connecting one set of terminals of the levers, and members connecting the other terminals of the levers with the said arm.

2. In a flexible coupling, an arm adapted to be secured to a shaft, a pin adapted to be secured for rotating with another shaft, a lever fulcrumed to the pin intermediate of its terminals, with one of its terminals normally extending toward the shaft, means connecting the other terminal of the lever with the first arm, and means for limiting the rotary movement of the lever.

3. In a flexible coupling, an arm adapted to be secured to a shaft, a disk adapted to be secured to another shaft, two levers pivoted to the disk intermediate of their terminals with their fulcrums spaced apart and with a terminal of each of the levers normally extending toward the axis of the disk, a link connecting the said terminals of the levers, and members connecting the other terminals of the levers with the first mentioned arm.

4. In a flexible coupling, an arm adapted to be secured to a shaft, a disk adapted to be secured to another shaft, two levers pivoted intermediate of their terminals to the disk, the levers being normally disposed substantially radially relatively to the axis of the disk, a link connecting one set of terminals of the levers, and members connecting the other terminals of the levers with the first mentioned arm.

5. In a flexible coupling, an arm adapted to be secured to a shaft and having two openings, one at each end, a disk adapted to be secured to another shaft, two levers pivoted intermediate of their terminals to the disk, there being an opening in a terminal of each lever, flexible members secured to the openings and connecting the arm with the terminals of the levers having the openings, and a link connecting the other terminals of the levers.

6. In a flexible coupling, an arm adapted to be secured to a shaft, a disk adapted to be secured to another shaft, two levers, each pivoted substantially at its center to the disk with the fulcrums of the levers spaced apart and with the levers disposed substantially radially, a link adjacent the axes of the shafts and connecting the neighboring inner arms of the levers, and means connecting the other arms of the levers with the first mentioned arm.

7. In a flexible coupling, a disk adapted to be secured to a shaft, two levers, each pivoted substantially at its center to the disk with the fulcrums of the levers spaced apart and with the levers disposed substantially radially, a link adjacent the axes of the shafts and connecting the neighboring inner arms of the levers, an arm adapted to be secured to another shaft and having set off ends projecting in the general direction of the disk, and means connecting the set off ends of the last mentioned arm with the other arms of the levers.

8. In a flexible coupling, a shaft, an arm secured to the shaft, a second shaft, a disk secured to the second shaft, two levers each pivoted substantially at its center to the disk, with the fulcrums of the levers spaced apart and with the levers disposed substantially radially, a link adjacent the axes of the shafts and connecting the neighboring inner arms of the levers, and means connecting the other arms of the levers with the first mentioned arm.

9. In a flexible coupling, a shaft, a disk secured to the shaft, two levers each pivoted substantially at its center to the disk, with the fulcrums of the levers spaced apart and with the levers disposed substantially radially, a link adjacent the axes of the shafts and connecting the neighboring ends of the levers, an arm secured to the second shaft and having set-off ends projecting in the general direction of the disk, and means connecting the set-off ends of the last mentioned arm with the other arms of the levers.

In testimony whereof I have signed my name to this specification in the presence of the two subscribing witnesses.

ALBERT N. CLASSON.

Witnesses:
F. A. GERDING,
FLOSSIE E. ALLISON.